Figure 1:
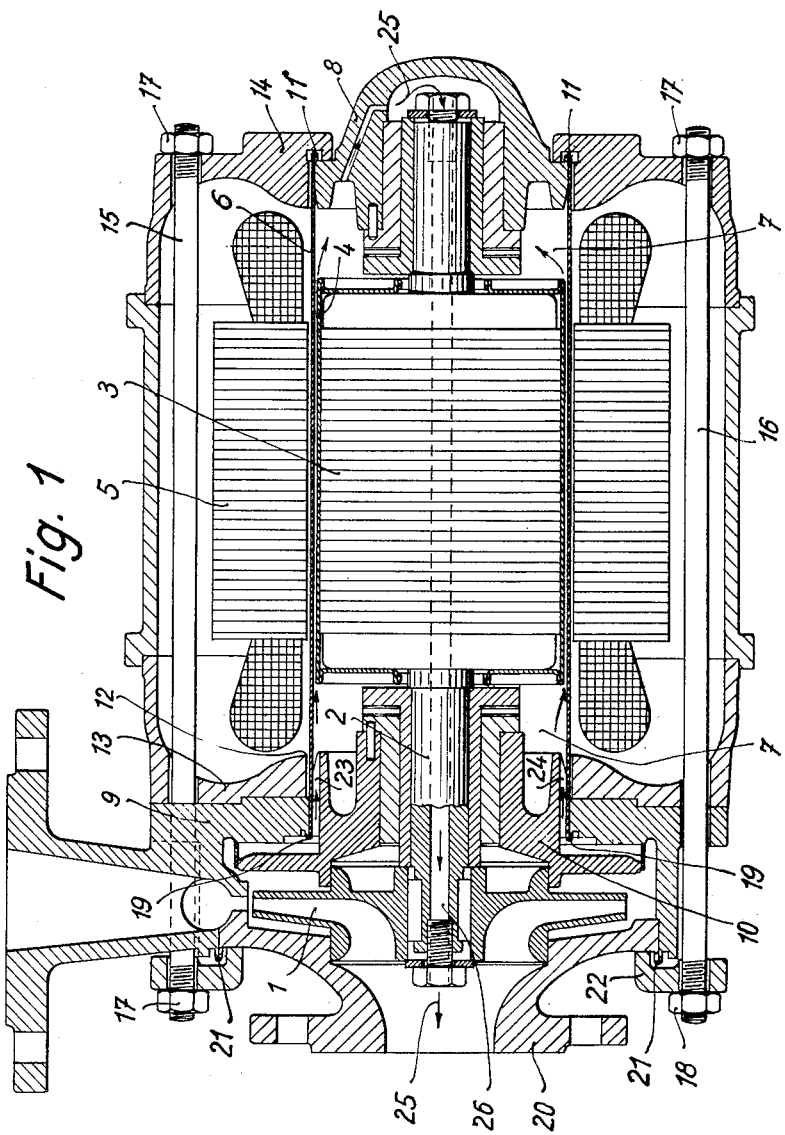

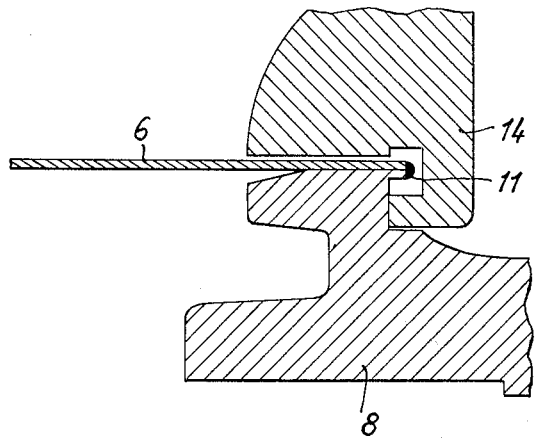
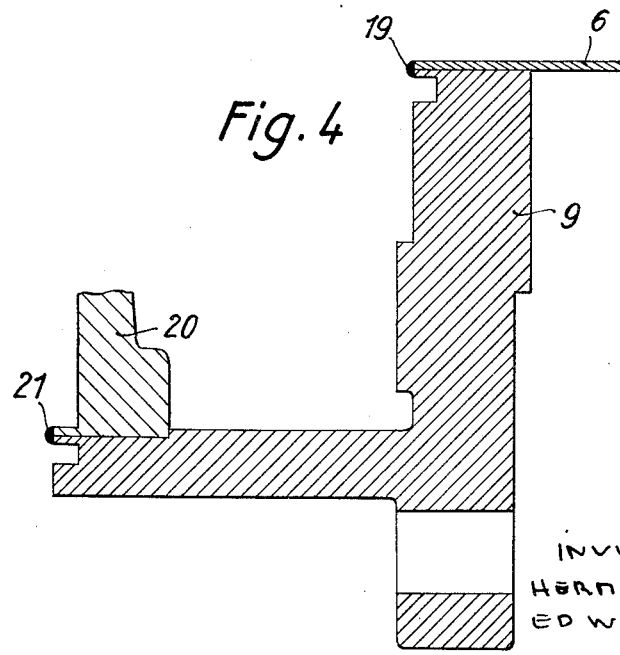

United States Patent Office 3,067,690
Patented Dec. 11, 1962

3,067,690
PUMP UNIT WITH CANNED ELECTRIC MOTOR
Hermann Krämer, Rotebuckweg 60, Freiburg im Breisgau, and Edwin Herr, Freiligrath Strasse 77, Freiburg-Haslach, Germany
Filed Nov. 30, 1959, Ser. No. 856,282
Claims priority, application Germany Dec. 1, 1958
4 Claims. (Cl. 103—87)

The present invention relates to a pump, and more particularly to a centrifugal pump, which is especially suitable for conveying a chemically active or radioactive liquid medium, and which is driven, preferably by means of a common shaft, by an electric motor of the "canned" type in which the stator and rotor are fully encased individually relative to each other and are separated by a gap or rotor space through which a part of the liquid which is conveyed by the pump is passed in order to cool and/or lubricate the motor.

It is an object of the present invention to provide a pump of the type as above described which does not require any compressed packing means especially at the side thereof facing toward the motor. This is attained according to the present invention by providing a fluid-tight connection between the pump housing and the stator sleeve, which separates the stator from the canned rotor and encloses the rotor space, by connecting these parts directly and integrally to each other by welding, soldering, or the like so as not to be removable from each other except by cutting, whereby any possibly of leakage of the pump unit and especially of the driving part thereof due to a defective packing or improper manipulation of the pump will be completely eliminated.

A preferred embodiment of the invention consists in designing the pump unit so that at the side of the motor facing toward the pump the stator sleeve which encases the stator of the canned electric motor toward the inside is mounted within an aperture in the pump housing which is thereby hermetically closed in the radial directions toward the outside, and so that at the opposite side of the motor, this stator sleeve is hermetically closed at a stationary part which is associated with the canned rotor and has a diameter smaller than that of the opening at the side of the stator sleeve facing toward the pump, that is, at a part from which the stator may be withdrawn in the direction toward the side of the motor away from the pump.

It is in this manner possible to produce a pump which is driven by a so-called canned electric motor and which is at all times secure from any leakage of the liquid contained therein, and thus eliminates any need for any packing means.

The pump unit which is thus attained has not only the advantage that it is at all times secure from any leakage of the liquid conveyed by the pump and also contained under pressure within the motor, and that it thus eliminates any need for any packing means within and between the pump and motor, but it also has the further advantage that the stator may be easily withdrawn from the rotor for repairs or other reasons without thereby producing any opening through which the liquid could emerge from the motor.

The invention is further designed to increase the useful life of the pump to a considerable extent, and its application is of a very great advantage, particularly in all those cases in which the liquid to be conveyed by the pump is chemically corrosive, injurious to health, or even radioactive.

A further improvement of the entire pump unit may be attained according to the invention if the suction intake of the pump is also welded to the pump housing and if both parts are additionally secured by being firmly clamped to each other by means of a compression ring which is applied in the axial direction from the outside. In this event, no packing means of any kind will be required for the entire unit.

Another feature of the invention consists in the provision of a pair of passages connecting the inside of the pump housing with the rotor space and in providing these passages at the highest and lowest points within the wall which forms the stator sleeve and encloses the rotor space. By arranging these passages in this particular manner, it is possible to evacuate the rotor space completely. This is of the greatest importance since due to the centrifugal force of the liquid within the rotor space, any traces of air remaining in the rotor space will at the rotation of the pump be passed toward the shaft and dry out the bearings so that they will soon wear out.

Figure 2:
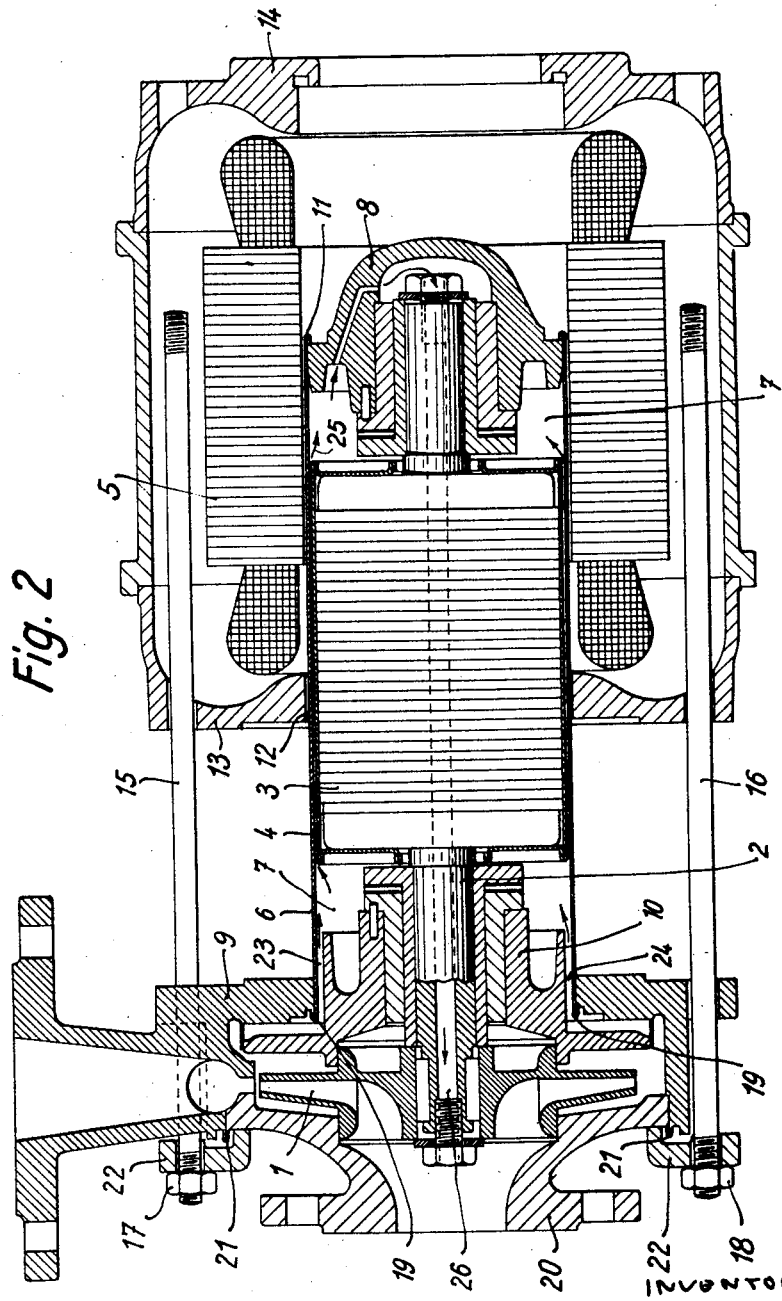

These and other objects, features, and advantages of the present invention will become further apparent from the following detailed description thereof, particularly when the same is read with reference to the accompanying drawings, in which FIGURE 1 shows a central vertical longitudinal section of a pump and motor unit according to the invention;

FIGURE 2 shows a view of the unit similar to that in FIGURE 1, but in which the stator is shown as being partly withdrawn for repairs or similar purposes;

FIGURE 3 shows an enlarged cross section of a part of the end-bearing block of the motor, and illustrates the manner in which the outer end of the stator sleeve is welded to the bearing block; while FIGURE 4 shows an enlarged cross section of a part of the pump housing, and illustrates the manner in which the end of the stator sleeve facing toward the pump as well as the pump intake are welded to the pump housing.

Referring to the drawings, the pump unit illustrated therein is a centrifugal pump with an impeller 1 with one pumping stage which, however, could also be increased to several stages. This pump impeller 1 is mounted on a shaft 1 which also forms the drive shaft of the motor which is directly combined with the pump to form a single unit. This motor is a so-called canned electric motor, that is, one in which the rotor 3 is completely encased or "canned" by a cylindrical jacket 4, and in which the stator 5 is likewise encased toward the inside by a cylindrical sleeve 6 which also encloses the so-called rotor space 7, i.e. a gap between the rotor jacket 4 and the stator sleeve 6, through which a part of the liquid flows which is branched off the high-pressure side of the pump.

According to the invention, the end of the stator sleeve 6 remote from the pump is welded solidly to the bearing block 8 so as to provide an absolutely fluid-tight connection between the stator sleeve and the bearing block. At the side facing toward the pump, the end of the stator sleeve 6 is welded to the outer pump housing 9, and this weld extends into a recess in housing 9 which also contains the bearing block 10 and is thus hermetically sealed toward the outside.

If bearing block 8, which is welded all around the edge of the projecting lip 11 to sleeve 6, is made of a smaller diameter than the inner diameter of the aperture 12 in the end wall 13 of stator 5 facing toward the pump, and if the opposite end wall 14 of the stator is designed so as to overlap the bearing block 8 of the rotor at the outside, it will be possible, after the nuts 17 and 18 which hold the different parts of the units together are unscrewed from bolts 15 and 16, to withdraw the stator from the canned rotor, as illustrated in FIGURE 2, without any danger that by such withdrawal the rotor space 7 which communicates with the pump chamber and is hermetically sealed at the welded lips 11 and 19 might at any point be opened toward the outside. This rotor space 7 thus remains completely encased at all times without requiring any packing means.

If the joint between the pump intake 20 and the pump housing 9 is also provided with an all-around lip-like weld 21, no packing of any kind will be required for the entire pump unit. In this case, the solidity of the connection may be further improved by providing a compression ring 22 which overlaps the pump intake at the outside and may be tightened by clamping bolts 15 and 16 and their nuts 17 and 18.

At those points where the stator sleeve 6 is welded to housing 9, a pair of passages 23 and 24 are provided at the highest and lowest points within sleeve 6 through which the rotor space 7 may be completely evacuated. Thus, no air will remain within the rotor space 7 which, due to the centrifugal force of the liquid contained in the rotor space 7 could during the rotation of the motor penetrate to the shaft and thereby cause the bearings to run dry and to be worn out quickly.

If it should for any reason become necessary to open the rotor space, this may be easily attained by turning off the welding lips 11 or 19 in a lathe. Also the pump intake 20 can be opened only by turning off the welding lip 21. Since all of these lips have a certain length, they may, if necessary, be repeatedly turned and opened and subsequently rewelded.

The flow of liquid passing from the pump housing through rotor space 7 is indicated in the drawings by the arrows 25. It passes from the high-pressure side of the pump through the inlet passages 23 and 24 and possibly also through longitudinal bores provided in the bearings, and returns to the low-pressure side of the pump through the central channel 26 in shaft 2.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. In a centrifugal pump and motor unit especially for pumping chemically active fluids, in combination, a pump housing having an end wall; first bearing means in said end wall; an elongated sleeve concentric with said bearing means and having one end welded to said end wall to form a fluid tight connection therewith about said first bearing means, said sleeve projecting from said end wall away from said pump housing; second bearing means closed at the outer end thereof, fitted in the other end of said sleeve and welded thereto to form a fluid tight connection therewith; a shaft turnably mounted in said bearing means and having one end extending through said first bearing means into said pump housing; a pump impeller mounted in said pump housing on said one end of the shaft for rotation with the latter; an encased electric rotor mounted between said bearing means on said shaft and having an outer diameter slightly smaller than the inner diameter of said sleeve to define with the latter an annular gap between sleeve and rotor; passage means providing communication between the interior of said pump housing and the interior of said sleeve beyond the end wall of said pump housing; stator means surrounding said sleeve and including a stator housing having an end wall engaging said end wall of said pump housing, said stator housing end wall being formed with a circular opening therethrough having an inner diameter greater than the outer diameter of said sleeve and the outer diameter of said second bearing means; and releasable connecting means for holding said end walls to each other so that upon release of said connecting means said stator means may be removed from said pump and motor unit in a direction away from said pump housing while said sleeve fluid tightly enclosing said rotor remains connected to said pump housing.

2. In a centrifugal pump and motor unit especially for pumping chemically active fluids, in combination, a pump housing having an end wall formed with an opening therethrough defined by an inner cylindrical surface; first bearing means in said opening of said end wall; an elongated sleeve concentric with said opening and having one end located in said opening with the outer surface of said sleeve engaging said inner cylindrical surface and welded along an edge portion at said one end to said end wall to form a fluid tight connection therewith about said first bearing means, said sleeve projecting from said end wall away from said pump housing; second bearing means closed at the outer end thereof, fitted in the other end of said sleeve and welded thereto to form a fluid tight connection therewith; a shaft turnably mounted in said bearing means and having one end extending through said first bearing means into said pump housing; a pump impeller mounted in said pump housing on said one end of the shaft for rotation with the latter; an encased electric rotor mounted between said bearing means on said shaft and having an outer diameter slightly smaller than the inner diameter of said sleeve to define with the latter an annular gap between sleeve and rotor; passage means providing communication between the interior of said pump housing and the interior of said sleeve beyond the end wall of said pump housing; stator means surrounding said sleeve and including a stator housing having a first end wall engaging said end wall of said pump housing and a second end wall spaced from said first end wall, said first stator housing end wall being formed with a circular opening therethrough having an inner diameter greater than the outer diameter of said sleeve and the outer diameter of said second bearing means and said second end wall being formed with an opening therethrough through which said second bearing means partly extends to be centered therein; and releasable connecting means in the form of a plurality of elongated fastening bolts extending through said end walls for holding said first end wall of said stator means to said end wall of said pump housing so that upon release of said connecting means said stator means may be removed from said pump and motor unit in a direction away from said pump housing while said sleeve fluid tightly enclosing said rotor remains connected to said pump housing.

3. A centrifugal pump and motor unit as defined in claim 2 in which said pump housing has a peripheral wall projecting inwardly from the periphery of said pump housing end wall to one side of the latter so as to leave an outwardly projecting annular flange on said end wall, said peripheral wall having at the free end face thereof an annular lip, and a cover formed with a suction opening therethrough and engaging the free end of said peripheral wall and being welded thereto along said annular lip, and in which said fastening bolts extend through said annular flange beyond said cover and including a pressure ring fastened to said bolts and engaging said cover to press the latter against said peripheral wall of said pump housing.

4. A centrifugal pump and motor unit as defined in claim 1 in which at least two passage means are provided located opposite each other and respectively aligned with the highest and lowest portions of said gap.

References Cited in the file of this patent

UNITED STATES PATENTS

| | | |
|---|---|---|
| 2,688,946 | Jarsaillon | Sept. 14, 1954 |
| 2,803,763 | Dunn | Aug. 20, 1957 |
| 2,804,556 | Schanz | Aug. 27, 1957 |
| 2,890,660 | Umbricht | June 16, 1959 |
| 2,906,208 | White | Sept. 29, 1959 |